United States Patent [19]

Kiuchi

[11] 4,277,667

[45] Jul. 7, 1981

[54] INDUCTION HEATING APPARATUS WITH NEGATIVE FEEDBACK CONTROLLED PULSE GENERATION

[75] Inventor: Mitsuyuki Kiuchi, Kadoma, Japan

[73] Assignee: Matsushita Electric Industrial Co., Ltd., Kadoma, Japan

[21] Appl. No.: 50,757

[22] Filed: Jun. 21, 1979

[30] Foreign Application Priority Data

| | | | |
|---|---|---|---|
| Jun. 23, 1978 | [JP] | Japan | 53-76869 |
| Jul. 10, 1978 | [JP] | Japan | 53-84472 |
| Aug. 2, 1978 | [JP] | Japan | 53-94846 |

[51] Int. Cl.[3] .......................... H05B 6/06; H05B 6/12; H02M 7/48

[52] U.S. Cl. .......................... 219/10.49 R; 219/10.77; 363/97; 363/80; 323/285

[58] Field of Search ...................... 219/10.49 R, 10.77; 363/131, 97, 96, 80; 307/253; 323/22 T

[56] References Cited

U.S. PATENT DOCUMENTS

| | | | |
|---|---|---|---|
| 3,733,540 | 5/1973 | Hawkins | 323/22 T X |
| 3,798,531 | 3/1974 | Allington | 323/22 T X |
| 3,846,694 | 11/1974 | Archer | 363/96 |
| 4,112,286 | 9/1978 | Alderman et al. | 363/96 X |
| 4,115,676 | 9/1978 | Higuchi et al. | 219/10.77 X |
| 4,145,592 | 3/1979 | Mizukawa et al. | 219/10.49 R |

*Primary Examiner*—Arthur T. Grimley
*Assistant Examiner*—Philip H. Leung

[57] ABSTRACT

An induction heating apparatus includes a DC power source, a transistor for generating a trigger current in response to a base drive pulse applied thereto, and a resonant load circuit including a work coil and a capacitor for generating in response to the trigger current an oscillating resonant current when the switching device is turned off, and which current is passed through a diode connected in inverse parallel relation with the transistor. A current transformer is provided to detect the load current. A low voltage detector senses a nearly zero voltage at the collector of the transistor and triggers a ramp generator to generate a ramp voltage which is compared with a reference voltage to generate a train of base drive pulses for application to the transistor. To control the base drive pulses at a variable duration in accordance with an inductive load, the reference voltage is varied as an inverse function of the sensed load current.

11 Claims, 11 Drawing Figures

INDUCTION HEATING APPARATUS WITH NEGATIVE FEEDBACK CONTROLLED PULSE GENERATION

BACKGROUND OF THE INVENTION

The present invention relates to an induction heating apparatus in which a power representative signal is negatively fed back to render the oscillation frequency variable in accordance with the inductive load to provide constant power delivery to the load.

Conventional induction heating apparatus are relatively complicated in circuit configuration to provide various features for safe operation of the inverter circuit under varying magnitude of utensil loads, resulting in an increase in cost which has prevented the extensive use of the induction heating apparatus.

SUMMARY OF THE INVENTION

An object of the present invention is to provide an induction heating apparatus which provides constant power regardless of variations in external power source or loading with a minimum of power loss.

Another object is to provide an induction heating apparatus which achieves a high frequency conversion efficiency.

A further object of the invention is to provide a low cost, reliable induction heating apparatus particularly for cooking purposes.

According to the present invention there is provided and induction heating apparatus comprising a DC power source, a transistor connected to receive power from the DC power source to generate a trigger current in the presence of a control pulse applied thereto, a diode connected in inverse parallel relation with the transistor, a resonant load circuit including an induction heating work coil and a capacitor for generating in response to the trigger current an oscillating current, means for detecting the magnitude of an electrical quantity in the load circuit, means for detecting a predetermined voltage level of the potential across the transistor, and negative-feedback-controlled pulse generating means responsive to an output signal from the voltage detecting means for generating an output pulse with a duration which varies as an inverse function of the detected electrical quantity for application to the transistor as the control pulse.

Preferably, the pulse generating means comprises a ramp generator responsive to an output signal from the low voltage detecting means to generate a ramp voltage and a comparator for comparing the ramp voltage with a reference voltage which is varied as an inverse function of the detected electrical quantity of the load circuit so that the output of the comparator is a train of pulses whose duration is controlled by the negatively feedback-controlled reference voltage. In order to further stabilize the inverter operation, signals from the low voltage detecting means are inhibited by the output signal from the comparator to prevent the low voltage detecting means from delivering unwanted signals.

BRIEF DESCRIPTION OF THE DRAWINGS

The invention will be further described in detail with reference to the accompanying drawings, in which.

DETAILED DESCRIPTION

Figure 1:
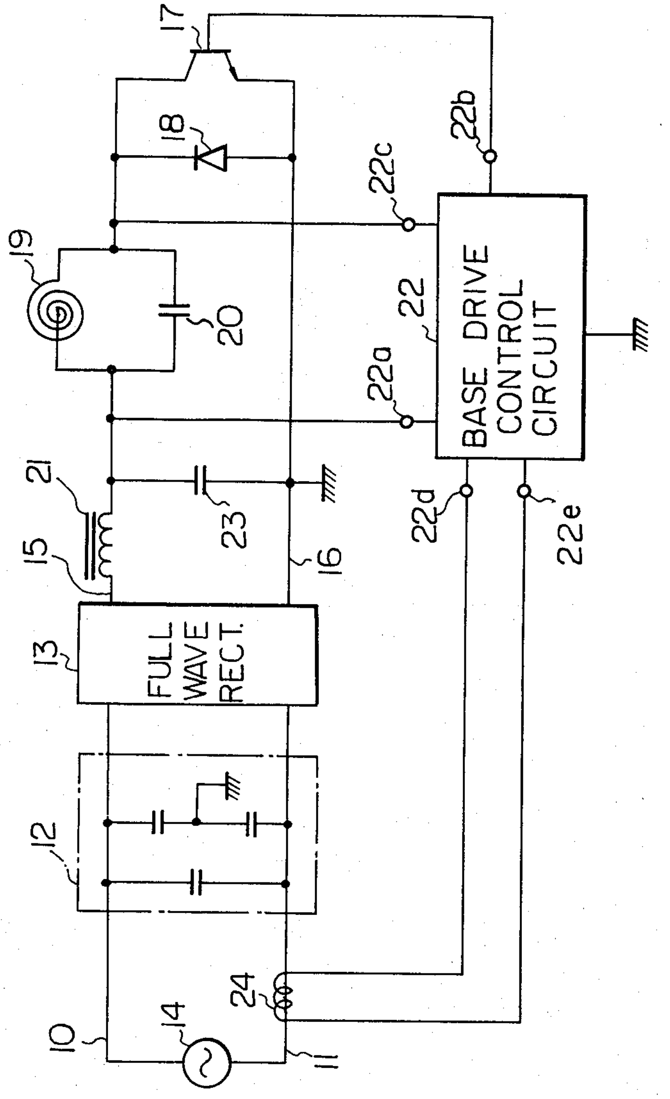
FIG. 1 is a general schematic diagram of the induction heating apparatus of the invention.

The induction heating apparatus according to the invention shown in FIG. 1 comprises a filter capacitor network 12 connected to the input power lines 10, 11 and a full-wave rectifier 13 which converts a low frequency alternating current from a source 14 into full-wave rectified sinusoidal halfwave pulses which appear across positive power line 15 and negative power line 16 which is grounded. A semiconductor switching unit, comprising an inversely parallel connected power transistor 17 and diode 18, is connected between the power lines 15 and 16, with the collector of transistor 17 connected to the positive line 15. A resonant load circuit, including a parallel-connected induction heating work coil 19 and a capacitor 20, is connected in the power line 15 in series with a filter inductor 21 and the semiconductor switching unit. The transistor 17 receives power from the rectifier 13 to generate in response to a base drive pulse supplied from a control circuit 22, a trigger current that passes through the load circuit, the latter acting as a source of oscillating current which is generated during the time when the transistor 17 is turned off, the period of the oscillating current being a function of the resonant frequency of the load circuit which is in the ultrasonic range. A filter capacitor 23 is connected between the power lines 15, 16 to allow the high frequency current to circulate through the inverter circuit comprised by the load circuit and the switching unit.

The base drive control circuit 22 receives power from the positive power line 15 through terminal 22*a* to supply a base drive pulse to the transistor 17 through terminal 22*b* in response to the high frequency voltage reducing to a nearly zero voltage level by sensing the voltage across the switching unit through terminal 22*c*. To determine the interval of the base drive pulse to transistor 17, the control circuit 22 also receives current from a current transformer 24 associated with the input power line 11 through terminals 22*d* and 22*e*.

Figure 2:
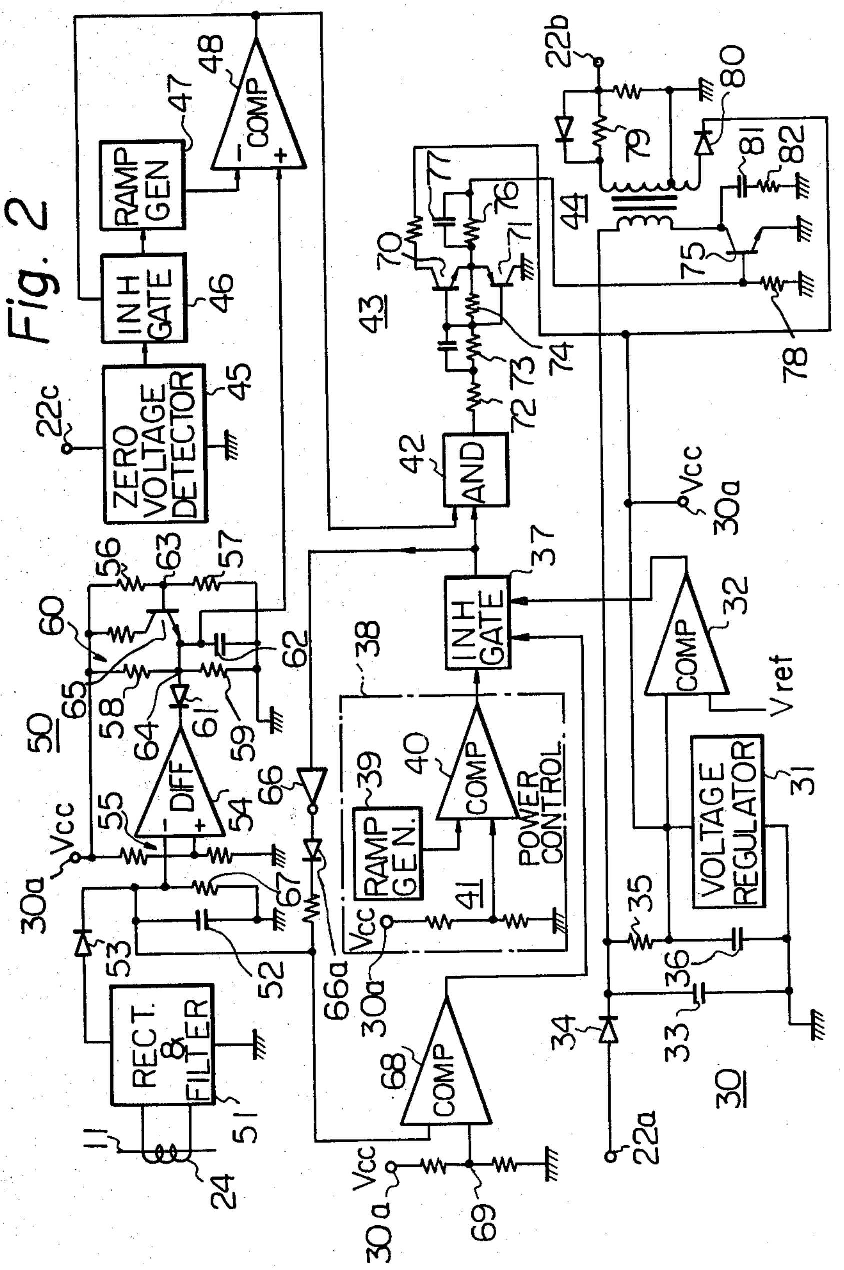
FIG. 2 shows details of the base drive control circuit of the apparatus of FIG. 1.

Details of the control circuit 22 are illustrated in FIG. 2. The control circuit 22 includes a DC power supply circuit having a voltage regulator 31 and a voltage comparator 32 which receives power from terminal 22*a* to charge a storage capacitor 33 via diode 34 to develop a filtered DC voltage across the capacitor 33 which is in shunt with a circuit including a resistor 35 and a second storage capacitor 36. The voltage developed across the capacitor 36 is maintained at a constant level by the voltage regulator 31 of a conventional design and fed into one terminal of the comparator 32 for comparison with a reference voltage applied to another input thereof and also to a power supply terminal 30*a*. The output of the comparator 32 remains low to provide a delayed action to the heating apparatus until it becomes stabilized after the power switch is turned on.

A power control circuit 38 is provided for intermittently supplying gate drive pulses to the transistor 17. This circuit comprises a ramp generator 39 and a voltage comparator 40 which compares the ramp voltage with a user-controlled voltage reference from a voltage divider 41 to generate a train of constant frequency pulses whose duration is a function of the user's setting level to provide different ratios of active to inactive periods so that its active period has a longer duration when a relatively high power level is desired than it has for a lower desired power level. The pulses from the power control circuit 38 occur at a much lower frequency than the ultrasonic frequency of the inverter circuit and serves as an enable signal for an AND gate 42 which is adapted to pass gate trigger pulses to a pulse amplifier circuit 43 and thence to a pulse transformer 44.

The gate trigger pulse is derived from a circuit including a low (nearly zero) voltage detector 45 connected to the input terminal 22*c*, an inhibit gate 46, a ramp generator 47 which operates as a free-running oscillator in the absence of trigger pulses and a voltage comparator 48. The low voltage detector 45 detects when the high frequency voltage at the collector of switching transistor 17 drops to nearly zero and feeds a trigger impulse through the inhibit gate 46 to the ramp generator 47 to cause it to generate a ramp voltage which is then compared in the comparator 48 with a reference voltage. This reference voltage is derived from a variable reference setting circuit 50 which includes a rectifier-filter circuit 51 connected to receive current from the current transformer 24, a storage capacitor 52 connected by a diode 53 to the rectifier-filter 51 to develop a voltage for the inverting input of a differential amplifier 54 for making a comparison with a reference voltage provided by a voltage divider 55 corresponding to a rated value of power input. Further included is a clamping circuit or limiter 60 which comprises a first circuit leg including resistors 56 and 57 connected in series between voltage supply terminal 30*a* and ground to define a low threshold voltage $V_L$ at a circuit node 63, and a second circuit leg formed by series-connected resistors 58 and 59 connected in parallel with the first circuit leg to define a high threshold voltage $V_H$ at a circuit node 64. A transistor 65 is provided having its base connected to the node 63 of resistors 56 and 57 and its emitter connected to the node 64 of resistors 58 and 59, the latter node 64 being coupled by a diode 61 to the output of the differential amplifier 53 and also to ground by a storage capacitor 62. When the voltage across the capacitor 62 is lower than the low threshold voltage $V_L$ at node 63, the transistor 60 is rendered conductive to charge the capacitor unti it develops a voltage equal to $V_L$, so that the capacitor voltage is clamped to $V_L$, and if the diode 61 is nonconductive, the capacitor 62 is charged to the voltage level of $V_H$ at the circuit node 64.

Therefore, when the input current is lower than the rated value, the output signal from the differential amplifier 54 is negative to render the diode 61 non-conductive, so that the capacitor 62 is charged to $V_H$, and when the input current is higher than rated value, the diode 61 becomes conductive to discharge the capacitor 62 by an amount proportional to the differential voltage, so that the capacitor 62 will develop a voltage inversely proportional to the input current. Since the magnitude of the input current varies as a function of the power delivered to the load circuit including an inductive utensil placed over the work coil 19, the voltage across the capacitor 62 varies as an inverse function of the amount of power delivered to the utensil.

The voltage developed in capacitor 52 is monitored by a voltage comparator 68 which generates an inhibit signal when the monitored voltage is lower than a specified level determined by a voltage divider 69 and feeds it to the inhibit gate 37.

Assuming that the voltage across the capacitor 52 has reached the normal operating level and the reference voltage across capacitor 62 is likewise at a suitable level, the output from the ramp generator 47, which is initially operating as a free-running oscillator, drives the comparator 48 to a high output state. A high level output signal from the power control oscillator 38 enables the AND gate 42 to apply the output from the comparator 48 to the pulse amplifier 43 and thence to the pulse transformer 44.

The pulse amplifier 43 includes a pair of transistors 70, 71 of opposite conductivity types having their emitters connected together to the output of the AND gate 42 through series-connected resistors 72, 73 and 74 and to the base of a switching power transistor 75 through parallel-connected resistor 76 and capacitor 77. The transistors 70 and 71 receive power from the voltage supply terminal 30*a* to generate current therethrough in response to the base drive derived from the junction between resistors 73 and 74. The transistor 70 is turned on in response to the base drive pulse to turn on the transistor 75 charging the capacitor 77. The reverse bias on the capacitor 77 biases the transistor 71 on to produce a reverse current through resistor 78 connected between the base of transistor 75 and ground to turn it off, providing a fast switching action of transistor 75. This results in a rapid rise in voltage in the primary of the transformer 44 to generate a base drive control pulse in the secondary winding which is applied to the base of power transistor 17 through resistor 79. An intermediate point of the secondary of the transformer 44 is connected to ground and the end of the secondary winding opposite to the terminal connected to the base of transistor 17 is connected by a diode 80 to the voltage supply terminal 30*a* to charge the capacitor 36 with part of the energy generated in response to the base drive pulse in the secondary winding. A snubber circuit formed by series-connected capacitor 81 and resistor 82 is connected across the collector of switching transistor 75 and ground to minimize the effect of a rapid change in the collector voltage of the transistor 75 upon turning it again in the absence of its base drive.

By virtue of the feedback current to the capacitor 36 from the secondary of the pulse transformer 44, the resistance value of the coupling resistor 35 can be held to a minimum, so that the amount of power loss therein is minimized. If without the energy feedback operation, a low-frequency transformer would be required to generate the DC power.

Figure 3:
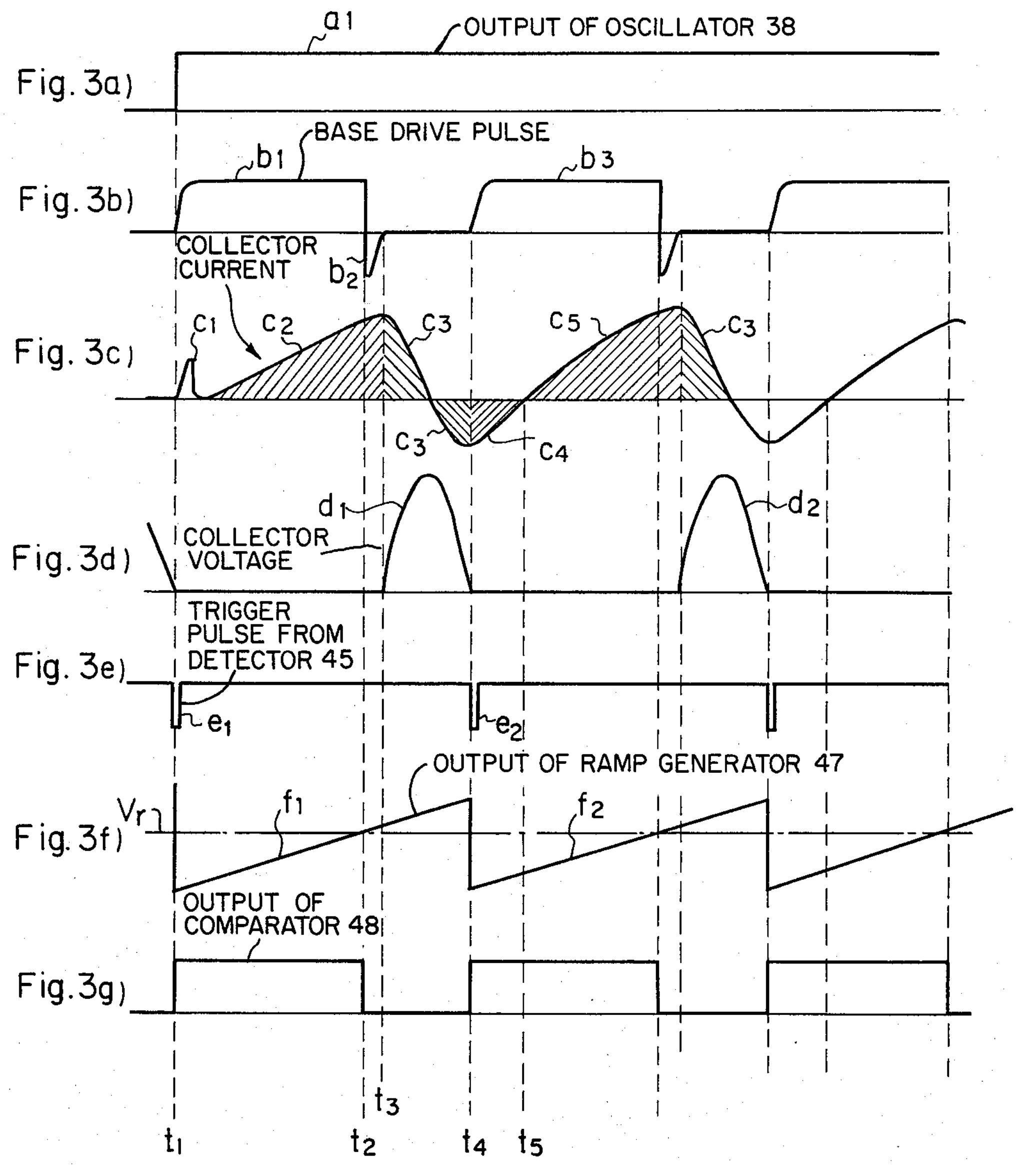
FIGS. 3*a* to 3*g* are waveform diagrams associated with the apparatus FIGS. 1 and 2.

The operation of the circuit of FIG. 2 is visualized with reference to waveforms shown in FIGS. 3*a* to 3*g*. With the output of the comparator 48 being initially at a high voltage level (FIG. 3*g*), a base drive pulse b1 (FIG. 3*b*) is generated by the positive edge of an output pulse a1 (FIG. 3*a*) of the power control oscillator 38 to turn on transistor 17 at time $t_1$, causing capacitor 20 to discharge producing a positive spike C1 and subsequently a current C2 (FIG. 3*c*) through the transistor 17 and the load circuit and causing the voltage at the collector of transistor 17 to drop to nearly zero (FIG. 3*d*). A trigger pulse e1 is generated from the low voltage detector 45 to allow the ramp generator 47 to generate a ramp voltage f1 (FIG. 3*f*) and when this ramp voltage reaches the reference level Vr supplied from the capacitor 62 of variable reference circuit 50, the comparator 48 is switched to a low voltage output state at time $t_2$ (FIG. 3g), thus terminating the drive pulse b1. This results in a negative going pulse b2 in the secondary of transformer 44 to quickly turn off the transistor 17. The turn-off of transistor 17 causes its collector potential to rise again producing a positive halfwave voltage d1 (FIG. 3d) which decays to nearly zero at time $t_4$ and at the same time permits the load circuit to produce an oscillating current c3 during the interval from $t_3$ to $t_4$, which interval is primarily determined by the resonant frequency of the load circuit.

Responsive to the voltage d1 reducing to the nearly zero voltage level at time $t_4$, the low voltage detector 45 produces a trigger pulse e2 which resets the ramp generator 47 to produce a second ramp voltage f2 which causes a second base drive pulse b3 to occur. Concurrently, the diode 18 is rendered conductive due to the absence of positive high potential d1 at time $t_4$ and allows the negative current c3 to pass therethrough as current c4 until time $t_5$, whereupon the transistor 17 is rendered conductive to generate a positive current c5 which passes through transistor 17 and the load circuit. This process is repeated so long as the enable pulse a1 is present.

Since the reference voltage Vr supplied to the comparator 48 is inversely proportional to the current flow in the load circuit, the width of the pulse delivered from the comparator 48 is controlled in a negative feedback fashion in response to the amount of the input current so that the interval between successive halfwave pulses d1 and d2 is substantially held constant for a given load. Otherwise stated, the oscillation period is variable in accordance with the loading so long as the reference voltage Vr is within the range between upper and lower limits $V_H$ and $V_L$, so that the amount of power delivered to the load during the active period of the power control circuit 38 is held constant.

Therefore, the voltage across the transistor 17 is held constant within safe limits, ensuring a safe operation of the inverter circuit under varying loads. With this negative feedback pulse width control, the negative load current c3, c4 increases to a maximum value while the transistor 17 current c5 decreases to a minimum value, so a substantial amount of power savings is achieved during the no load condition since the negative current represents negative power and the reduction of the positive current reduces the power dissipation of the transistor 17.

The above-described negative feedback pulse width control is inhibited during the inactive period of the power control oscillator 38 by increasing the voltage across the capacitor 52 with a charging current supplied through diode 66a from the inverter 66 connected from the output of the inhibit gate 37. The high voltage on capacitor 52 drives the differential amplifier 54 to a negative voltage level at its output to cause the diode 61 to be rendered conductive to discharge the capacitor 62 until the voltage thereacross reaches the minimum threshold level $V_L$ which appears at the junction 63. Therefore, during the inactive period of the oscillator 38, the comparator 48 output has a minimum pulse duration, and this minimum pulse duration exists for a certain period set by the time constant value of capacitor 52 and resistor 67 immediately following the positive edge of the pulse 84 of the oscillator 38. This short-duration trigger pulse drives the transistor 17 with a small amount of power and assures safe operation of the inverter circuit during the initial period of the enablement by the power control circuit 38. The voltage across the capacitor 52 will be subsequently charged with the current supplied from the filter 51 so that it takes on a value representative of the load current to resume the negative feedback pulse width control.

In the presence of the output pulse from the comparator 48 the inhibit gate 46 is activated to prevent the passage of any trigger pulse which might occur due to the spurious high frequency components of the oscillation current through the inverter circuit. The resistance values of resistors 56 and 57 of the clamping circuit 50 are so chosen that the minimum threshold $V_L$ corresponds to the inherent turn-off time of transistor 17. The minimum threshold $V_L$ thus sets an upper limit to the oscillation frequency and ensures against the failure of turn-off of transistor 17 which might occur when the load size is excessively large.

When the size of a load is very small such as a fork or spoon which is inadvertently placed over the work coil 19, a very small current will flow in the input circuit 11 and the comparator 68 senses this condition by detecting a small voltage developed in the storage capacitor 52 and provides an inhibit signal to the gate 37 to disable the inverter circuit.

The time constant value of the storage capacitor 52 and resistor 67 is so selected that charge on capacitor 52 is representative of an average value of the input current through lead 11. This provides an advantage in that there is a minimum amount of input current variations due to the difference in material between different inductive loads. Capacitor 62 on the other hand serves as a damping circuit for purposes of absorbing transient variations of reference voltage which might occur in response to a rapid variation of load such as replacement of a utensil during cooking operation.

Figure 4:
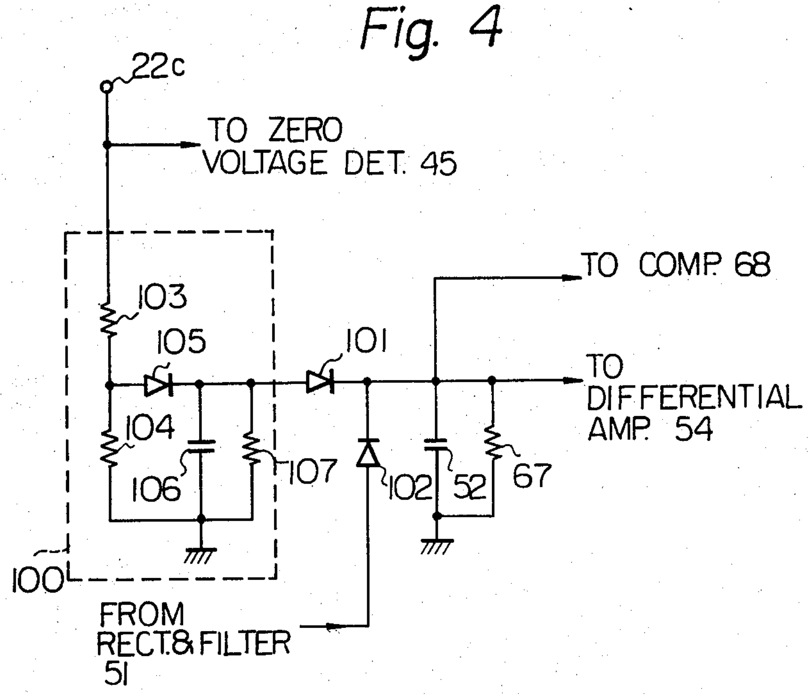
FIG. 4 is a modification of the circuit of FIG. 2.

Since it is known that an inductive load utensil of non-magnetic stainless material produces a larger input current and a smaller oscillation voltage then in the case of an inductive load of ferrous material, it is preferable to utilize the peak oscillation voltage as a negative feedback signal in addition to the input current value. This is accomplished by a peak detector 100 as illustrated in FIG. 4 which has its input connected to the terminal 22c and its output connected via diode 101 to the differential amplifier 54 to which the capacitor 52 and resistor 67 are connected. The output of the rectifier-filter 51 is also connected to the differential amplifier 54 through a diode 102 which forms with the diode 101 a comparing circuit which supplies a higher voltage to the capacitor 52. The peak detector 100 essentially comprises a voltage divider formed by resistors 103 and 104 with the junction therebetween being connected by a diode 105 to a capacitor 106. The capacitor 106 is charged through the diode 105 when the latter is forward biased. A resistor 107 is connected in parallel with the capacitor 106 to discharge it when the diode 105 is backward biased so that the voltage developed across the capacitor 106 is representative of the peak value of the voltage at the collector of transistor 17. With the negative feedback operation, both input current and oscillation voltage are maintained constant and hence the power level is held constant for a given user's setting regardless of the size of load to be heated. Furthermore, an overvoltage at the collector of transistor 17 can be effectively prevented by the negative feedback signal derived from the peak detector 100.

Figure 5:
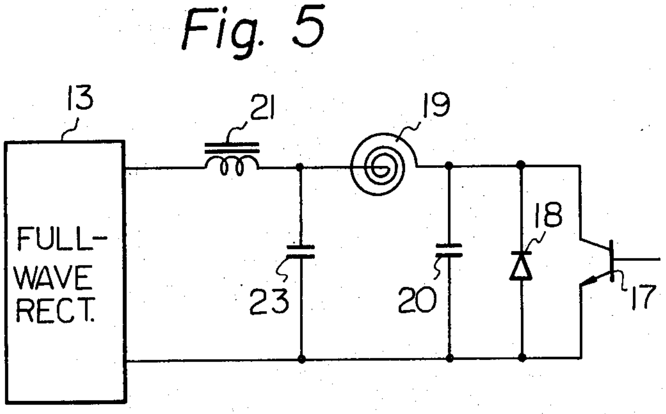
FIG. 5 is a modified circuit diagram of FIG. 1.

The circuit of FIG. 1 can be modified as shown in FIG. 5 in which the commutating capacitor 20 is connected across the diode 18. However, the parallel connection of work coil 19 and capacitor 20 as illustrated in FIG. 1 is preferred since it reduces the current passing through the capacitor 23, so that a small capacitance value is required for the capacitor 23.

What is claimed is:

1. An induction heating apparatus comprising a full-wave rectifier for converting low frequency alternating current energy into full-wave rectified energy, a solid-state inverter including a switching transistor receiving energy from said full-wave rectifier, a diode connected inversely parallel with said transistor, a resonant circuit including an induction heating work coil and a capacitor tuned to a high frequency, a zero crossing detector for detecting a zero crossing point of a potential across said transistor, and a negative feedback-controlled pulse generator including means for generating a signal related to the input power supplied to said full-wave rectifier, a ramp generator responsive to the detected zero crossing point for generating a ramp signal, and a comparator for comparing said input power related signal with the instantaneous value of said ramp signal for generating a trigger pulse for application to said transistor, said trigger pulse having a duration which is a function of the difference between said compared signals.

2. An induction heating apparatus as claimed in claim 1, further comprising an inhibit gate connected between said zero crossing detector and said ramp generator for preventing the application of an output signal from said zero crossing detector to said ramp generator in the presence of said trigger pulse.

3. An induction heating apparatus as claimed in claim 1, wherein said negative-feedback controlled pulse generator further comprises a pair of first and second transistors of opposite conductivity types having their base electrodes connected together to be responsive to the output of said comparator, a parallel-connected circuit including a capacitor and a resistor, a third transistor having the base electrode thereof being connected through said parallel-connected circuit to the emitters of said first and second transistors, and a pulse transformer having a primary winding connected at one end to a voltage source and at the other end to ground through the collector-emitter path of said third transistor and a secondary winding for generating said trigger pulse, the collector-emitter paths of said first and second transistors being connected in series between a voltage source and ground.

4. An induction heating apparatus as claimed in claim 1, further comprising power control means including means for setting a user's desired power level and means for periodically permitting and preventing the application of said trigger pulse to said transistor at a frequency much lower than the frequency of said trigger pulse for respective periods with a ratio depending on said desired power level.

5. An induction heating apparatus as claimed in claim 4, further comprising means for reducing the duration of said trigger pulse so that it gradually increases during a certain interval immediately following the initiation of the period in which said trigger pulse is applied to said transistor.

6. An induction heating apparatus as claimed in claim 5, wherein said reducing means comprises an RC network for developing a signal indicative of an average value of said input power, a first reference setting circuit for establishing a low reference voltage $V_L$, a second reference setting circuit for establishing a high reference voltage $V_H$, a storage capacitor connected to said second reference setting circuit, switching means for charging said storage capacitor to said low reference voltage when the voltage across said storage capacitor is below said low reference voltage, discharging means including a differential amplifier having a first input connected to said RC network and a second input connected to a reference voltage for generating an output signal representative of the deviation of said average value from a predetermined rated value, and a diode connected between the output of said differential amplifier and said storage capacitor for discharging same by an amount proportional to the amount of said deviation, and means for charging the capacitor of said RC network during the period in which said trigger pulse is prevented from being applied to said transistor.

7. An induction heating apparatus as claimed in claim 1, further comprising a DC power source including a storage capacitor serving as a voltage source, a diode connected to the output of said full-wave rectifier for charging said storage capacitor, and a pulse transformer having a primary winding connected to be responsive to the output signal of said comparator and a secondary winding connected to the control terminal of said transistor, said secondary winding being further connected to said storage capacitor for charging same with part of the energy induced in said secondary winding.

8. An induction heating apparatus as claimed in claim 1, wherein said induction heating work coil is connected in parallel with said commutating capacitor and in series with said inversely parallel-connected transistor and diode between the output terminals of said full-wave rectifier.

9. An induction heating apparatus as claimed in claim 1, wherein said means for generating an input power related signal comprises a current transformer connected to an input terminal of said full-wave rectifier.

10. An induction heating apparatus as claimed in claim 9, wherein said means for generating an input power related signal further comprises a peak detector connected to be responsive to the voltage developed across said switching transistor.

11. An induction heating apparatus as claimed in claim 10, further comprising means for selectively coupling the one of the voltage developed in said current transformer and the voltage detected by said peak detector which is greater than the other to said first input of said differential amplifier.

* * * * *